United States Patent [19]

Meng

[11] Patent Number: 4,862,373
[45] Date of Patent: Aug. 29, 1989

[54] METHOD FOR PROVIDING A COLLISION FREE PATH IN A THREE-DIMENSIONAL SPACE

[75] Inventor: Alex C-C Meng, Plano, Tex.

[73] Assignee: Texas Instruments Incorporated, Dallas, Tex.

[21] Appl. No.: 49,754

[22] Filed: May 13, 1987

[51] Int. Cl.⁴ ............................................. G01C 21/00
[52] U.S. Cl. .................................... 364/444; 364/449; 364/461
[58] Field of Search ................ 364/444, 443, 449, 460, 364/461

[56] References Cited
U.S. PATENT DOCUMENTS
3,784,800  1/1974  Willateaux .......................... 364/461

Primary Examiner—Thomas H. Karcza
Assistant Examiner—David Cain
Attorney, Agent, or Firm—N. Rhys Merrett; James T. Comfort; Melvin Sharp

[57] ABSTRACT

A method for providing a collision free safe path includes storing predetermined spatial graphs representing the set of points defining the collision free paths within that region and calculating the shortest path over the region. Each of the points in the graph have associated therewith predetermined constraints which, where compared to real world navigational limitations, determine if the path is navigable. A collision free path is generated by first examining the set of points defining the path and comparing them with the real world limitations. If all of the available paths are not collision free on the prestored spatial graph, a modified spatial graph, at a different altitude if necessary, is defined with collision free paths and then the shortest path between two points on this graph determined and output to a navigation system. In the event that the initial navigational limitations are altered during traversing of the shortest path, the same process will be repeated, i.e., a new spatial graph can be generated defining the collision free paths and the shortest path determined along this new shortest path from the point at which the navigational limitations changed.

29 Claims, 5 Drawing Sheets

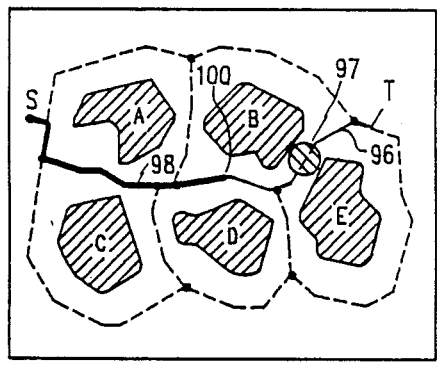
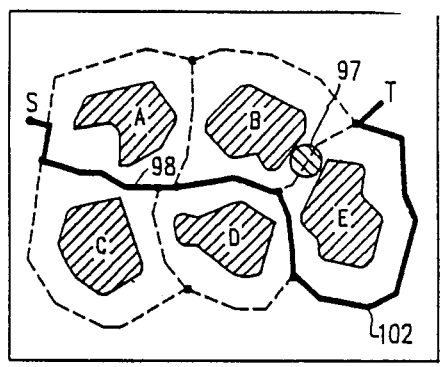
FIG. 8a  FIG. 8b
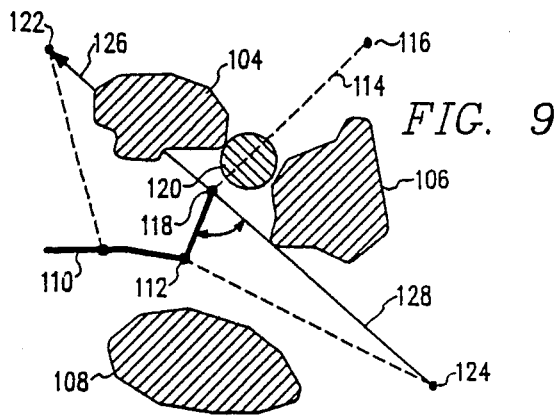
FIG. 9
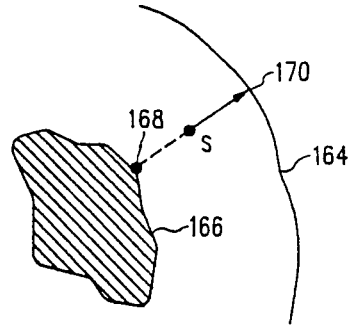
FIG. 11
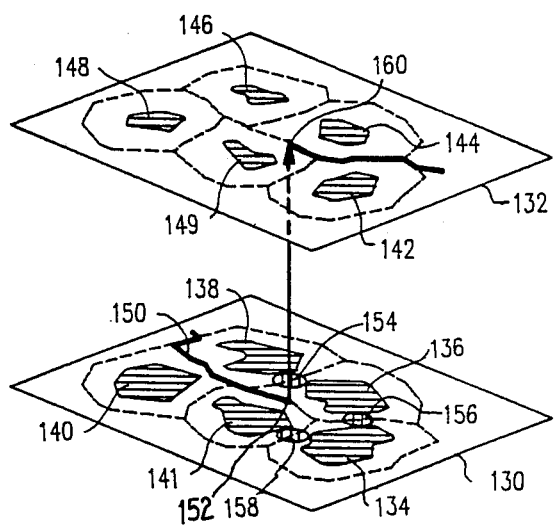
FIG. 10
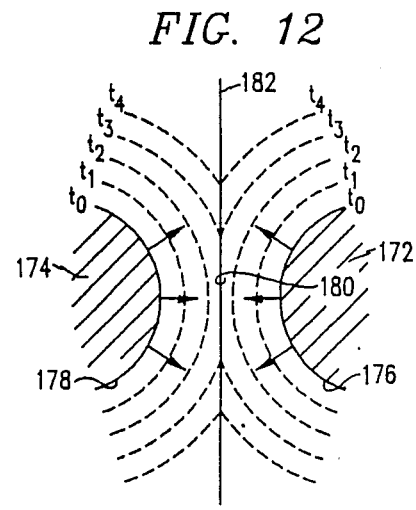
FIG. 12

METHOD FOR PROVIDING A COLLISION FREE PATH IN A THREE-DIMENSIONAL SPACE

TECHNICAL FIELD OF THE INVENTION

The present invention pertains in general to navigational systems and, more particularly, to a real time motion planning system that determines the collision free path in a three-dimensional real world.

BACKGROUND OF THE INVENTION

Maneuvering in three-dimensional space requires some type of navigation scheme, be it passive or active, that requires a safe path from a start point to a goal. Path planning between these points is a relatively straight forward problem in free space without obstacles. However, path planning becomes more difficult when obstacles are encountered in the three-dimensional space. In this situation, the collision free space must be defined and a path calculated which can be utilized in the navigation system.

The general path planning schemes utilized to define the collision free path are known as the "Find-Path" problems which find applications in the robotics and similar industries. There are two basic approaches for the "Find-Path" problem. The first approach represents the obstacles explicitly as geometrical shapes, like polygons, with the free space being defined implicitly as that space outside those obstacles. In one example of this approach, a spatial graph is generated which represents all of the visible paths between the vertices of obstacles and start and goal locations known as the Visibiity graph, T. Lozano-Perez and M. A. Wesley, "An Algorithm for Planning Collision-Free Paths Among Polyhedra Obstacles", Communications Association of Computing Machinery, Vol. 22, 1979. The other basic approach represents the free space explicitly and finds the path directly inside the free space. In one example of this approach, free space is represented as generalized cones with a central axis of these cones forming a connected path or passing channels, R. Brooks, "Solving the Find-Path Problem by Good Representation of Free Space", IEEE Transaction on System, Man and Cybernetics, Volume SMC-13, No. 3, 1983.

The path finding process for either these approaches searches for the path on the connectivity graph. By definition, the path found is therefore a safe path, i.e. collision free. One of the disadvantages of both approaches has been the high computational cost in finding the shortest path in three-dimensional space.

In solving the "Find-Path" problem, a spatial graph of some type is generated to provide a set of all safe points in the maneuverable free space which represents a given terrain map. It is then necessary to find the shortest path along the maneuverable space. There are two problems that can be encountered when maneuvering in the free space which represents a given terrain map. First, there is a location uncertainty as to the actual navigational path as compared to the calculated path which, if not considered, could result in collision with a boundary of the obstacles, which is also an inherent boundary of the free space. Second, there is a possibility that an unexpected obstacle not accounted for on the given terrian map could occur in the three-dimensional space, thus blocking a portion of the free space. With respect to the uncertainty measure of the location, this is a variable that can change at any time during navigation of a particular path depending upon the type of vehicle that is being navigated, the type of terrain over which it is being navigated and the type of navigation system that is being utilized. Therefore, it is difficult to predict what the uncertainty profile will be over the entire path when an initial path is generated therefore. With respect to an unexpected obstacle, this is typically something that would be detected during the navigation of a particular path which, of course, would render the spatial graph from which the path was determined invalid. These two factors are more important when navigating over a large area where localized sensors and the such are of little use.

In order to realize a practical solution to the "Find-Path" problem over a large section of a three-dimensional space, it is necessary to have a system that requires a relatively small computational budget that is capable of responding to instantaneous changes in both the maneuverable space and also in the navigational system. The present systems, as such, do not account for any variables like location uncertainty and unexpected obstacles in the navigation scheme or in the navigational space. There therefore exists a need for a navigational system that is capable of accounting for such changes that occur during navigation of a particular region.

SUMMARY OF THE INVENTION

The present invention disclosed and claimed herein comprises a path finding method for collision free navigation in a predefined three-dimensional space. The method includes first storing a plurality of predetermined spatial graphs. With each of the spatial graphs being associated with a two-dimensional level in the three-dimensional region with each spatial graph representing all available discrete paths through the associated two-dimensional level. Each of the paths has associated therewith predetermined navigational constraints. Coordinates are then received indicating the present position in addition to receiving navigational limitations. One of the spatial graphs is then selected for the highest priority two-dimensional level with the priority of the levels being predetermined. The received navigational limitations are then compared with the predetermined navigational constraints for each of the available paths on the selected level to determine the one of the available paths that can be safely navigated collision free. A collision free spatial graph is then generated for the selected two-dimensional level and is comprised of only the collision free paths that can be safely navigated. The shortest path is then calculated over the collision free paths between the present position and a predetermined goal in accordance with a predetermined shortest path algorithm. The coordinates for this shortest path are then output to a navigation system.

In another embodiment of the present invention, the navigational constraints are the minimum proximity to any obstacle that exits in the two-dimensional level with respect to any of the given paths. The corresponding navigational limitations is the uncertainty measure which, when exceeding a given proximity will result in a given path becoming unnavigable. Further, an unexpected obstacle can be detected which can effectively remove one of the collision free paths from the collision free spatial graph.

In a further embodiment of the present invention, motion constraints are associated with each of the paths.

In the event that an unexpected obstacle is detected and must be avoided, a new path can be calculated between the point of detection and another point on the available safe paths. A straight line is then calculated to this point and then a collision free shortest path calculated to the predetermined goal. The motion constraints allow a maximum turning angle such that reversal of direction is prohibited at the point of detection of the unexpected obstacle.

A further embodiment of the present invention, each of spatial graphs is comprised by the plurality of nodes which with each of the nodes connected by predefined paths. Each of the predefined paths is comprised of a set of points with each of the points disposed equidistant between the closest points on two adjacent obstacles within the two-dimensional level. The navigational constraints associated with each of the points are the proximity of the points to the obstacles. When calculating the shortest path between a point not on the path, a path is calculated between the point and a point on the path by the Retraction method to define the shortest path collision free path from the point to the closest path.

A technical advantage is provided by the present invention in that prestored spatial graphs are defined which comprise all the available paths within a particular two-dimensional region. Each of the paths has defined navigational constraints associated therewith to allow modification of the graph when navigational limitations do not allow traversal of a particular path. The shortest path can be calculated along this modified graph at any point of time during navigation. A further technical advantage is provided in that changes in uncertainty as to location at any point during navigation of a shortest path results in the generation of a new shortest safe path since unnavigable safe paths will be removed from the previously generated spatial graph. This can occur at any time during navigation of a particular path. A further technical advantage is provided by accounting for the detection of an unexpected obstacle which blocks one of the navigable paths in the shortest path. This path is then removed and a new path calculated within particular motion constraints of the navigable device. A further technical advantage is provided in that depletion of all available collision free safe paths on a particular level will result in calculation of the shortest path in the next higher level.

BRIEF DESCRIPTION OF THE DRAWINGS

For a more complete understanding of the present invention and the advantages there, reference is now made to the following description taken in conjunction with the accompanying drawings in which:

FIGS. 8a and 8b illustrate terrain maps at a single level with an unexpected obstacle disposed in one of the available paths;

FIG. 9 illustrates a detail of the path variation in the presence of an unexpected obstacle;

FIG. 10 illustrates a perspective view of the terrain map with unexpected obstacles in the first level;

FIG. 11 illustrates the retraction method; of calculating a path between two points;

FIGS. 12-14 illustrate the method for generating the spatial graphs;

DETAILED DESCRIPTION OF THE INVENTION

Figure 1:
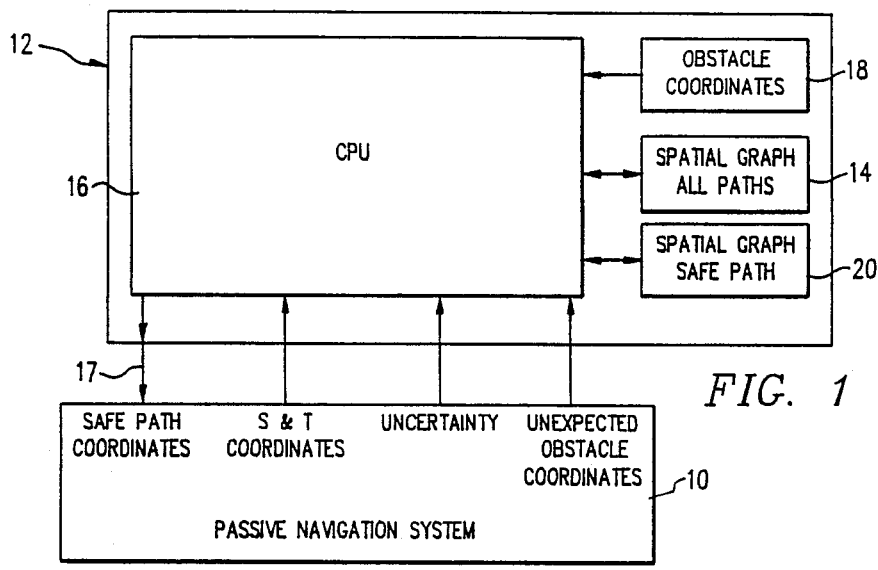
FIG. 1 illustrates a block diagram of a passive navigation system utilizing the path finding system of the present invention.

Referring now to FIG. 1, there is illustrated a schematic diagram of a path finding system 12 system for generating shortest collision free path on the spatial graphs that define the set of points for all safe paths in a particular region. The system generates the coordinates of the shortest safe path for output to a passive navigation system 10. The passive navigation system then utilizes the safe path coordinates to navigate through a defined maneuverable region. The path finding system 12 is operable to store in a memory location 14 various predefined spatial graphs which are representative of two-dimensional "slices" of the terrain within a defined boundary. For each defined boundary, there are a plurality of two-dimensional slices or spatial graphs which model the three dimensional space within the boundary. Each spatial graph consist of available paths and the associated constraints. A CPU 16 in the path finding system 12 is operable to interface with the predefined spatial graphs and also the passive navigation system 10 to determine first where, if any, are the safe paths in a particular two-dimensional slice and, second, what the shortest path is. The particular spacial graph is then modified, if necessary, to contain only collision free safe paths and then the modified spatial graph is stored in a memory 20. Safe path coordinates are then generated and output to the navigation system on a line 17.

The passive navigation system 10 is operable to input to the CPU 16 in the path finding system 12 uncertainty data about its location. This uncertainty data is generated during navigation of a particular path and provides an indication of the navigational uncertainty. For example, if a robot is being navigated with the passive navigation system 10, there are times when the robot is uncertain about its location owing to the terrain environment, cross winds or other navigational equipment error and can only estimate it to within a particular range "r." Therefore, if the distance between an obstacle and the calculated path is less than r, there is a probability that there will be a collision, since the calculated path is no longer collision free. This information is input to the path finding system 12 and a new safe path that is collision free is generated for a given uncertainty. This uncertainty is continually input during navigation of the calculated path.

In addition to the uncertainty data, data is also output from the passive navigation system 10 to the path finding system 12 regarding the presence of an unexpected obstacle upon detection. This feature is utilized when an obstacle that is not on the terrain map or spatial graph presents itself to the robot. Once the presence of the object and the coordinates thereof have been determined, this information is transmitted to the path finding system 12 for storage in a memory location 18. A new spatial graph defining the safe collision free path is then generated and stored in memory 20. As will be described hereinbelow, there are certain constraints associated with changing paths as a result of the occurrence of an unexpected obstacle, such as minimum turning angle, collision with objects, etc.

In operation, the passive navigation system 10 enters the start and goal coordinates to the path finding system 12, which coordinates will be referred to as "S" and "T", respectively. The path finding system 12 then selects the lowest level graph and determines first if there is a safe path anywhere on that level and, second what the shortest safe path is. If no safe path is available, the next level is selected, i.e. the robot moves to a higher altitude. Once a safe path has been calculated, this is output to passive navigation system to maneuver the robot along this path.

During maneuvering of the path, the robot makes a determination as to its deviation therefrom. This can result from such things as cross winds, lack of landmarks or just general navigation system tolerances. This information is converted to an uncertainty measure which in input to the path finding system 12. This can be done an any time and at any point along the path. Additionally, the coordinates of the what's expected position on the path at that given time are also input with the uncertainty to the path finding system 12. When the uncertainty is received, the path finding system 12 regenerates safe path coordinates and inputs these coordinates to the passive navigation system 10. The passive navigation system 10 then continues along this new safe path. This new safe path may be synonymous with the old safe path or it may be a new path. In any event, the coordinates of the path sent to the navigation system 10 have been updated.

Figure 2A:
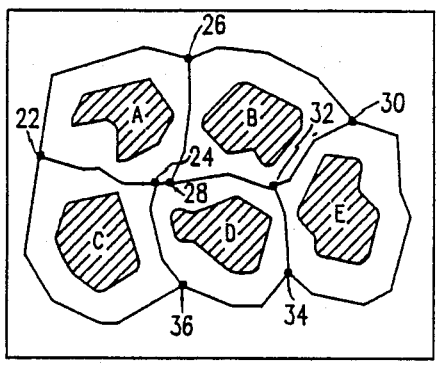
FIGS. 2a and 2b illustrate spatial graphs at two separate levels.
Figure 2B:
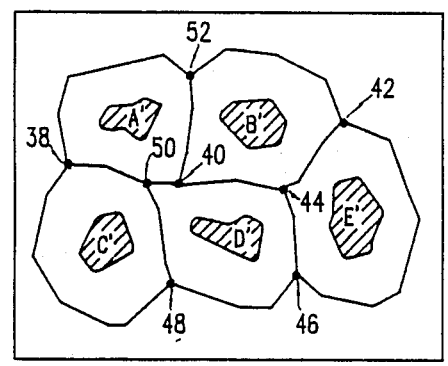

As described hereinabove, the three-dimensional space through which the robot is to be maneuvered by the navigation system 10 is divided into two-dimensional slices or levels, each slice occupying a separate level. Further, boundaries are defined on four sides of the two-dimensional space. The number of slices or levels is a parameter that depends upon the size of the region, the storage capacity and map resolution. A spatial graph can therefore be constructed which defines the boundaries of the obstacles and the external boundaries of the region for any two-dimensional slice or level. An example of two levels of spatial graphs are illustrated in FIGS. 2a and 2b with FIG. 2a representing a first "Level 1" and FIG. 2b illustrating a second "Level 2". The obstacles in Level 1 are labeled A, B, C, D and E and, in this example, illustrates a lower level. The obstacles in Level 2 are represented by the letters A', B', C', D' and E'. Level 2 represents a higher level and, in this example, the obstacles A'-E' appear smaller than the objects in Level 1 since this represents a real world contour map.

In modeling a two-dimensional contour slice of a particular region, an object is defined by its closed boundaries and free space is represented by all points that do not belong to the object in the given model. The distance between a point in free space and an object is defined as the minimum distance between the point and every point on the boundary of an object. To represent the free space bounded by the obstacle, the geometrical concept known as the Voronoi diagram is visualized to characterize the skeleton or passing channels of the free space between adjacent obstacles. The Voronoi diagram is basically a set of points between two adjacent obstacles with the distance from each point to either of the adjacent obstacles is equal. These points form edges which have two end points that are referred to as nodes. The points are ordered in a sequence from one end to the other with a Voronoi node defined as an intersection of Voronoi edges, with every Voronoi node consisting of the common intersection of exactly three edges. A formal definition of this concept can be found in F. P. Preparata, MI Schamos, Computational Geometry, Springer-Verlag (1985). Therefore, the Voronoi graph is the spatial graph that represent the skeleton of free space for a given world model. Abstractly, it is just a mathematical graph defined by nodes and adjacencies between nodes, i.e. edges, but geometrically the nodes denote exact locations in the two-dimensional contour map and the edges can only be tranversed from end to end in a unique way, defined by the sequence of edge points.

In FIG. 2a, there is a path defined between obstacles A and C by nodes 22 and 24. The path between A and B is defined by nodes 26 and 28, the path between obstacles B and E is defined by nodes 30 and 32, the path between obstacles D and E is defined by nodes 34 and 32 and the path between obstacles C and D is defined by a path between nodes 36 and 24. The path between obstacles A and D is defined by a path between nodes 24 and 28. A path is also defined between obstacles B and D between nodes 24 and 32. In addition to these paths, it is also necessary to define a path around the outside perimeter of the obstacles A-E; that is, treat the four boundaries of the terrain map as a single obstacle. This path has as its bounds the boundaries of the objects and also the boundaries of the region. Therefore, the path around obstacle A is defined betweeen nodes 22 and 26, the path around obstacle B is defined between nodes 26 and 30, the path around obstacle E is defined between nodes 30 and 34, the path around obstacle C is defined between nodes 36 and 22. The path around obstacle D is defined between nodes 34 and 36.

In a similar manner, FIG.2b has a path between A' and B' is defined by nodes 52 and 40, a path between obstacles A' and C' defined by nodes 38 and 50, a path between obstacles B' and E' defined by nodes 42 and 44, a path between obstacles E' and D' defined by nodes 46 and 44, a path between obstacles C' and D' defined by nodes 48 and 50, a path between obstacles A' and D' defined by nodes 40 and 50 and a path between obstacles B' and D' defined by nodes 40 and 44. Obstacle A' is bounded by a path between nodes 38 and 52, the obstacle B' is bounded by a path between nodes 52 and 42, obstacle E' is bounded by a path between nodes 42 and 46, obstacle D' is bounded by a path between nodes 46 and 48, and obstacle C' is bounded by a path between nodes 48 and 38.

Once the paths have been generated, they have associated therewith a set a coordinates for each point on the path and the proximity a measure, which is the minimum distance from the point to the closet obstacle. Therefore, in order to maneuver within a particular two-dimensional slice, it is only necessary to maneuver over one of the safe paths to insure collision free travel.

Figure 3:
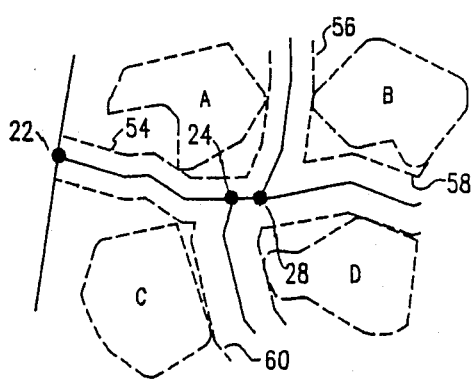
FIG. 3 illustrates a section of the spatial graph at level one depicting the collision free paths.

Referring to FIG. 3, there is illustrated a detail of the nodes 22, 24 and 28 and the obstacles A, B, C and D. For each connecting path between any two nodes, there is a minimum distance between the two obstacles that must be traversed in order for an object to traverse this path collision free, which is the proximity measure of the path between two nodes. In order to determine whether an object can traverse a path between two nodes, the object must be capable of passing between the two objects within this minimum distance to insure collision free navigation.

With further reference to FIG. 3, the path between nodes 22-24 is constrained within a corridor 54, the path between obstacles A and B is constrained within a corridor 56, the path between obstacles B and D is constrained within a corridor 58 and the path between obstacles C and D is constrained within a corridor 60. Each of the corridors 54-60 has a width determined by the minimum distance between the two adjacent obstacles along any path where the nimimum distance is determined by the point on the path having the smallest proximity. It is therefore not important what the shape of the obstacle is once the safe path has been determined. Rather, it is only important to determine what is the minimum distance between objects over a given path between two nodes in order to insure collision free navigation. In accordance with the present invention, the path will not be selected and therefore the object will not venture from one node to another unless the entire path is navigational. After the spatial graph has been generated as the Voronoi diagram by defining Voronoi nodes and Voronoi edges for all safe collision free paths, it is then necessary to enter an origin point S and a goal T and then calculate the shortest distance between the two points over the path.

Figure 4:
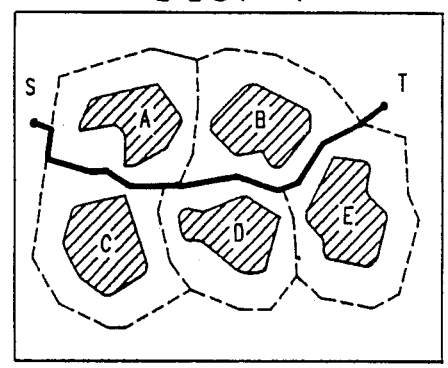
FIG. 4 illustrates one two-dimensional section of terrain over which a shortest path is traversed.

When dealing with a large space, it is not sufficient to merely rely on a path finding process based on the local environment. This type of navigation usually involves environment dependant local sensory driven navigation, i.e. performing a perception-action cycle around its immediate surroundings. This will be acceptable for small spaces, but when dealing with a large space, this type of path planning may not lead to a globally good and safe path. Moreover, it can lead the robot into traps, for instance, into a U-shaped obstacle. In accordance with the present invention, a determination is made as to the shortest path between two points on the map by first calculating the shortest distance between the points to the Voronoi edges and then by calculating the shortest path between the points on the Voronoi graph. For example, if S is not on a Voronoi edge, a path is first defined by a path planning process known as the Retraction Method, which defines a path between point S and a point on the Voronoi edge called the Retraction Point. The Retraction Point is determined by first taking the closest point on the nearest obstacle and drawing a line from the point on the object to S, which line will then intersect a Voronoi edge. This is termed the Retraction Edge. A similar Retraction process is formed between the point T and its retraction Voronoi edge. After determining the intersection points of the S Retraction edge and the T Retraction edge, a shortest path search algorithm is utilized to find the shortest path along the connected edges which are constrained by the surrounding obstacles. This will provide a globally good path. In the preferred embodiment, Dijkstra's shortest path algorithm is utilized. However, any shortest path algorithm can be utilized which can be found in the shortest path research on a finite graph in E. Lawler, Combinatorial Optimization: Networks and Matroids, Holt, Reinhart and Winston, 1976. An example of this is illustrated in FIG. 4.

Figure 5:
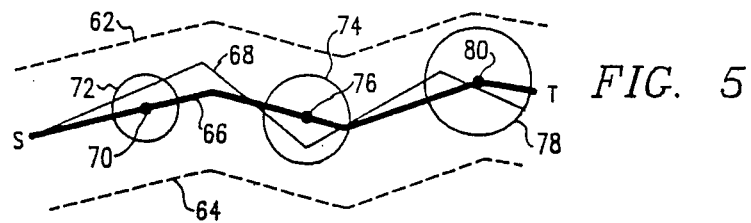
FIG. 5 illustrates a path between an origin and a goal with both the actual path and the expected path.

Referring now to FIG. 5, there is illustrated a simplified path between points S and T with S and T representing two nodes and the path therebetween representative of any of the Voronoi edges in the spatial graph. The path between nodes S and T is bound on either side by a first boundary 62 and a second boundary 64 to provide a corridor. This corridor is similar to the corridors illustrated in FIG. 3. The corridor defined by boundaries 62 and 64 define the constraints on the path; that is, the maneuverable space relative to the path between nodes S and T must be within boundaries 62 and 64. The calculated path between nodes S and T is represented by heavy lines 66, which coordinates are provided to the navigation system. The navigation system then enters these coordinates and attempts to navigate this path in the real world. However, there will always be some deviation as to the actual path traversed relative to the expected or calculated path. The acutual path traversed is represented by a thin line 68. It can be seen that the thin line 68 deviates from the expected or calculated path 66. Depending upon the navigation system utilized, there will be some type of uncertainty about its exact location for any given point on the path. Initially, the uncertainty should be zero and then it will increase or stay the same along the calculated path 66.

In the illustration of FIG. 5, the uncertainty of the navigation system when the calculated path 66 has been traversed to a point 70 thereon is defined by a disk 72 with the center thereof coincident with the point 70. The radius of the disk 72 is defined as a region about the point 70 on the calculated path 66 in which there is a high probability that the robot exists within the desk 72 at that time. This uncertainty can be due to a number of factors which may be equipment related or environmentally related to such things as wind speed, inclement weather, etc. Although a passive navigation system has been discussed, other navigation systems can be utilized which allow for correction. This, of course, is independent of the path finding system 12 which only requires that the navigation system determine its uncertainty and relay this information to the path finding system 12.

As the robot traverses the calculated path 66 within the boundaries 62 and 64 from the point 70, the uncertainty can change for a number of reasons. This is represented by a disk 74 centered about point 76 on the path 66, which occurs later in time than the point 70. At a later time, the uncertainty again changes as represented by a disk 78 centered about a point 80. It can be seen that the uncertainty never exceeds the boundaries 62 and 64 of the corridor defining the free space about the path over which collision free travel is permitted. Although it may be possible at any given point on the path to have an uncertainty that exceeds the boundaries 62 and 64, the path segment will not be collision free along its entire length. This will result in the path being removed from the safe path spatial graph and, as such, travel therealong will not be allowed. Once the uncertainty exceeds the corridor defined by the boundaries 62 and 64, another path must be calculated or collision may result. One aspect of the present invention is that the navigation system need make no decision as to the effects of this uncertainty. Rather, the path finding system 12 just updates the path from the point that uncertainty changes and feed back to the navigation system.

Figure 6:
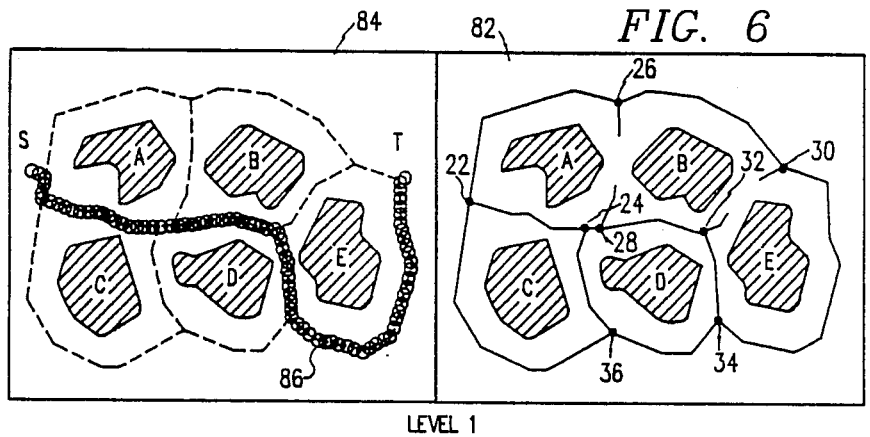
FIG. 6 illustrates a spatial graph and corresponding terrain map of one level and a given uncertainty.

Referring now to FIG. 6, there is illustrated an example of a safe path spatial graph 82 and a corresponding terrain map 84 at Level 1 for an uncertainty that prevents travel between the path that existed between obstacles B and E as defined by nodes 30 and 32 and also the path between obstacles A and B as defined by nodes 26 and 28. For simplicity purposes, the Voronoi spatial graph is illustrated on the right side and the actual terrain map is illustrated on the left side with the allowable paths illustrated with phantom lines on the terrain map.

When a particular uncertainty is present, the Voronoi graph is generated by first retrieving the complete Voronoi graph that was prestored showing all Voronoi edges, wherein each edge is comprised of a set of points with each point having a proximity number associated therewith. This proximity number defines the distance to the two adjacent objects. If the uncertainty exceeds the proximity, traversal at this point can not be insured as collision free. Therefore these points are removed from the Voronoi graph and a new graph generated defining only points that can be navigated collision free. This is represented as modified Voronoi graph on spatial graph 82 with associated terrain map 84 at Level 1. Once the modified Voronoi graph 82 is generated, the shortest path algorithm is utilized to plot the shortest path between points S and T in accordance with the method described above. This is illustrated by a path 86 which is illustrated by a series of disks, each disk representing the uncertainty which is constant over the entire path. This path will be generated at the point S to provide a globally safe path and also to provide the shortest path between S and T. This is to be compared with the shortest path demonstrated with respect to FIG. 4 wherein the path traversed the Voronoi edge nodes 30 and 32 between obstacles B and E. However, obstacles B and E are sufficiently close such that a point on the Voronoi edge therebetween has a proximity number that is less than the uncertainty factor. This in no longer a safe and collision free path and, therefore, it removed from the available safe path.

Figure 7A:
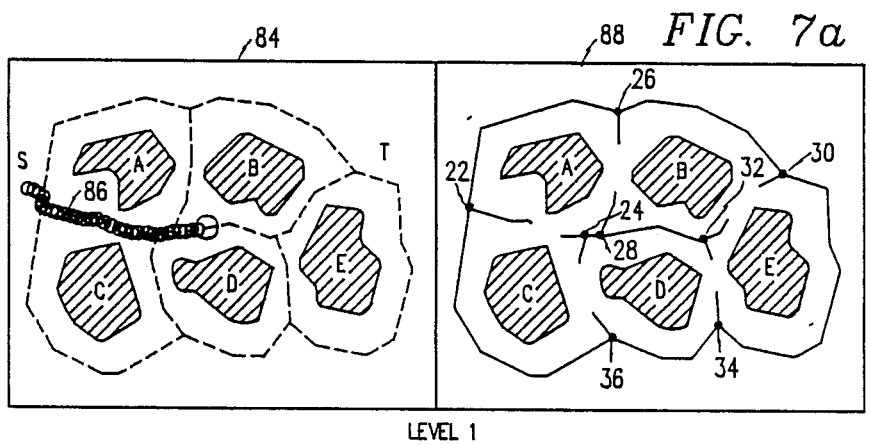
FIGS. 7a and 7b illustrate spatial graphs and corresponding terrain maps for two separate levels with a varying uncertainty in the navigational system.
Figure 7B:
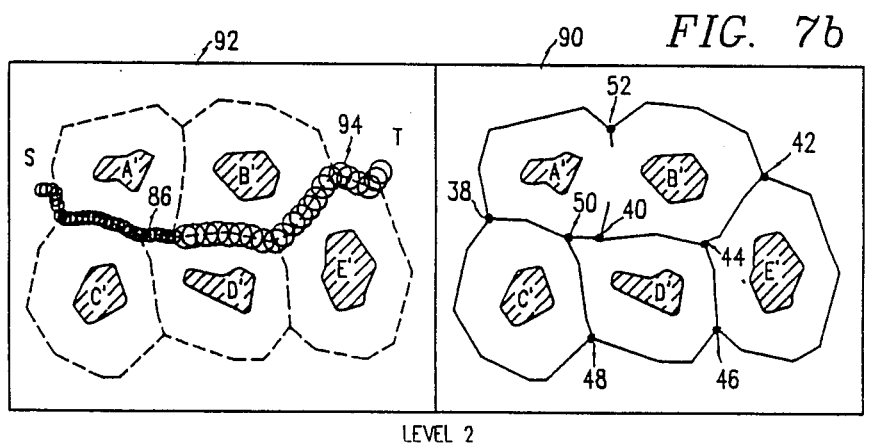

Referring now to FIGS. 7a and 7b there is illustrated the condition wherein the uncertainty changes during traversal of the path 86 of FIG. 6. By way of example, at a point in time when the calculated path 86 has been traversed to the point between nodes 28 and 32, the uncertainty increases. At this time, the path finding system 12 examines the spatial graph for Level 1 to determine if there are any available collision free paths at Level 1 between the point at which the uncertainty increases and the point T. In this example, it can be seen that the point at which uncertainty increased is in the middle of the objects A-E and that there are no paths available between any of the obstacles to allow the existence of a safe path to the point T at Level 1. Under this condition, the path finding system 12 increments to the next level, Level 2. This is illustrated in FIG. 7b with a spatial graph 90 and a corresponding map 92 at that level. At the second level, the Voronoi graph is generated within the constraints of the uncertainty, illustrating that the only path that cannot be traversed is the path between obstacles A' and B' on the path between nodes 40 and 52. However, there are numerous other paths that are available. The shortest path 94 is therefore calculated to the point T.

In navigating under uncertainty in accordance with the present invention, the calculated path is traversed and uncertainty information can be continually input to the path finding system 12 such that a collision free safe path is always known and a change in any condition that nullifys the collision free nature of the calculated path results in the calculation of a new collision free path for output to the navigation system. The collision free path will always be calculated on a given level until all available paths from the point at which the uncertainty changes are depleted. Thereafter, the spatial graph at the next level is examined to determine first, if there is a safe path for a given uncertainty on that level and, second, to calculate the shortest path on that level. This information in then output to the navigation system. In the situation where the uncertainty measure decreases, the path finding system 12 will perform the same process in the reverse direction; that is, the robot will try to reduce its altitude to a lower level when a safe path is available at the lower level.

When the Voronoi graph is generated, it takes into account all known obstacles in a given terrain. The spatial graph is then generated and stored. If, however, an unexpected obstacle occurs in one of the paths, this must be accounted for. this, of course, has to be detected by the passive navigation system and relayed to the path finding system 12 in order to calculate a new collision free path. Once an unexpected object is detected, these coordinates are relayed to the path finding system 12 to determine what the new collision free path is. A new collision free path is then calculated and transmitted to the navigation system. This is illustrated in FIGS. 8a and 8b.

In FIG. 8a, there is illustrated a terrain map at Level 1 with the Voronoi edges from the spatial graph illustrated with dotted lines showing the available paths. The shortest path calculated by the path finding system 12 is illustrated by a thin line 96. An unexpected obstacle is illustrated between the obstacles B and E which bridges the path 96. The actual traversal of the path 96 is illustrated by a heavy line 98. The path 96 is traversed until the robot reaches a point where an unexpected obstacle 97 is detected. This is represented by a point 100. Once the unexpected obstacle 97 is detected, the coordinates thereof are relayed to the path finding system 12 and a new path calculated. This is illustrated in FIG. 8b wherein the remaining portion of the traversed path is represented by a heavy line 102. This provides for an instantaneous reaction in the generation of a safe path in the presence of unexpected obstacles. Again, the path finding system 12 has made a decision after receiving the coordinates of the unexpected obstacle 97 that the present path is not a safe path and, as such, a new safe path must be generated and input to the navigation system.

Referring now to FIG. 9 there is illustrated a detail of the path calculation for the presence of an unexpected obstacle at the point of detection of the obstacle wherein the obstacle occurs between the same two nodes defining the path over which the robot is traversing. FIG. 9 illustrates 3 predefined obstacles 104, 106 and 108. The robot traverses a path 110 to a node 112 and then along a given path 114 from node 112 towards a node 116. The path between the node 112 and node 116 is the determined safe and shortest path. However, at a point 118, an unexpected obstacle 120 is detected between obstacles 104 and 106. At this point, a new path must be generated. There are two alternatives. First, a new path can be generated in accordance with the path planning solution based on the Retraction method to find the shortest path between point 118 and the goal (T). However, this may require a complete reversal in the current heading of the robot which may not be satisfied within its motion constraints.

In the preferred embodiment, a constraint is placed upon the system with respect to the maximum turning angle which can be tolerated. When this maximum turning angle has been reached, there is an angle $\theta$ between the new path and the reverse path. Since the robot cannot reverse its direction, a determination is made as to which node on the spatial graph is the closest and a straight line calculated thereto from the point 118. It is then determined whether this path intersects with the boundary of any of the obstacles 104–108 or the unexpected obstacle 120. If there is an intersection, this is an unsafe path. By way of example, there are two additional nodes, node 122 and 124 illustrated. The calculation of the path to node 122 results in a straight line path 126 that intersects with obstacle 104, thus resulting in an unsafe path. A straight line path is then calculated to node 124 which results in a straight line path 128 which does not intersect with object 106 and the turn angle is less than the maximum turn angle, thus providing a collision free path. The complete path is then calculated from point 118 to node 124 and then follows the shortest path determined from node 124 along Voronoi edges to the goal in accordance with the shortest path algorithm utilized to generate the spatial graph. The modified spatial graph is then generated and the coordinates output to the navigation system. It is important to note that the actual points comprising the boundaries of the obstacles are utilized to determine if there is an intersection of the calculated straight line path and the obstacle.

Referring now to FIG. 10 there is illustrated a perspective view of two levels of a terrain map, a first level 130 and a second level 132. In the first level 130 there are five obstacles 134, 136, 138, 140 and 141 and in the second level 132, there are also five obstacles 142, 144, 146, 148, and 149. In general, the obstacles 142–149 correspond to the obstacles 134–141 but they are smaller. The level 132 represents a higher altitude than the level 130. In the level 130, there are paths defined by phantom outlines which paths are derived from the Voronoi diagram for that level (not shown). In a similar manner, there are phantom lines outlining various paths around the obstacles 142–149 in level 132 which also corresponds to the Voronoi diagram for that level (not shown). In each level there are coordinates for the origin (S) and goal (T) points. The shortest path is first plotted in level 130 and is initiated at S and traverses from S along a path 150 to a point 152. At point 152, three unexpected obstacles are encountered. They are an unexpected obstacle 154 between obstacles 136 and 138, an unexpected obstacle 156 between obstacles 134 and 136, and an unexpected obstacle 158 between obstacles 134 and 141. As described above, a decision must be made at this point whether a safe path can be maneuvered within the level 130, which path is collision free. Since all paths are blocked except for the immediate reverse path, the path finding system 12 retrieves a Voronoi graph for the level 132 to determine if there is a safe collision free path available at that level. Assuming obstacles do not appear in the level 132, the safe path can be calculated. The safe and shortest path is therefore traversed from a point 160 in level 132, corresponding to point 152 in level 130, to the point T along a path 162.

Although the decision in the example of FIG. 10 to change from one level to another was made as a result of encountering unexpected obstacles, this decision also could be made as a result of an increase in uncertainty. Of course, this can have even broader applications to any decision making process which is made at point 152 as the result of the safe paths in that level disappearing. Prior to arriving at the point 152, there was an available safe path between S and T in that particular level. Therefore, the decision was made during traversal of the path merely by inputting information into the path finding system 12.

Referring now to FIG. 11, there is illustrated a schematic representation of the path finding problem solution for moving from a point S in the free space which in not on a Voronoi edge to a point on the Voronoi edge. A Voronoi edge 164 and an object 166 are illustrated. By definition of the Voronoi spatial graph, each object occupies a Voronoi region; that is, Voronoi edges will surround each and every object in the spatial graph. The first determination that must be made is whether the point S is outside the boundary of the object 166 and in which Voronoi region the point S lies. By the Retraction Method, a point 168 is first found on the boundary of the object 166 that is closest to the point S. A line is then drawn from point 168 to the intersection with the Voronoi graph 164, with the intersection forming a retraction point 170. The path is then defined as being between point S and point 170 on the Voronoi edge 164. This is a collison free path, first by definition of the Voronoi edge and, second, by definition of the Retraction Method. Once the intersection 170 is determined on the Voronoi edge 164, the shortest path is then determined along the Voronoi edges.

Referring now to FIG. 12, there is illustrated the method by which the Voronoi graph is generated. The algorithm utilized to compute the Voronoi diagram in the preferred embodiment is the "Prairie Fire" algorithm in the reverse direction, Duda & Hart, "Pattern Classification and Scene Analysis" p. 356, John Wiley & Sons, New York, 1973. This algorithm has been utilized to determine the internal skeleton of a particular object. For example, if a circle is an object, each point on the edge thereof is retracted inward by predetermined increments until the points merge. At the merge points, a skeleton is defined. For a circle, this would be a point. If an ellipse were evaluated by the Prairie Fire algorithm, each point could merge to a line on the central axis. The line would determine the medial axis of the particular object. In the preferred embodiment, the Prairie Fire algorithm is utilized with a variation in that the points on the boundaries of each obstacle are incremented outward away from the center toward each other. When the points meet, this defines a point on a Voronoi edge.

In FIG. 12, there are two obstacles 172 and 174 illustrated. Obstacle 172 has a boundary 176 and obstacle 174 has a boundary 178. The respective boundaries 176 and 178 are incremented outward from the central portion of the obstacles 172 and 174 from time $t_0$ to time $t_4$. At time $t_0$ the boundaries 176 and 178 have not been moved. At time $t_1$, the boundaries increment outward toward each other in a radial fashion by a predetermined distance. They continue to radiate toward each other until time $t_3$ wherein the two closest points on the edges 176 and 178 meet at a point 180. Thereafter, each of the points on the boundaries 176 and 178 merge to form an edge 182. This is the Voronoi edge. Each point on the Voronoi edge is equi-distance between two adjacent obstacles. It should be noted that for the spatial graph, a Voronoi edge is defined between the boundary of the obstacles on the terrain map. The boundary appears as the edge of an obstacle with everything interior to the boundary appearing as the body of an obstacle.

Figure 13:
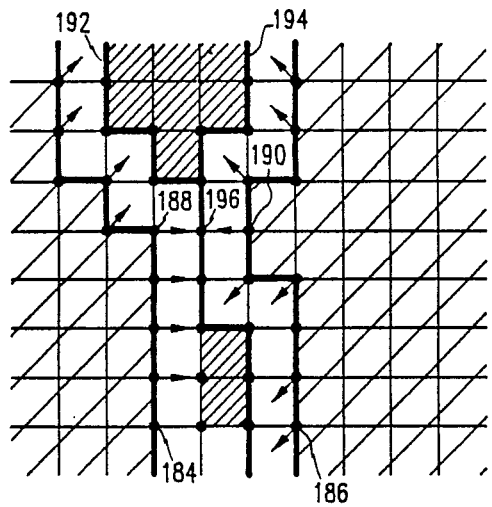

Referring now to FIG. 13, there is illustrated a more detailed analysis of how the Voronoi edges are computed to formulate the spatial graphs. A grid is first defined which comprises orthogonal coordinates. Each of the points is assigned a specific value. If the point is on the boundary or within the boundary of the obstacle, it is assigned a prime number. If the point is in free space it is assigned the value of "0". These are the initial values. In the grid of FIG. 13, there are two obstacles defined with boundary lines 184 and 186. Each point on the boundary line 184 and each point on the boundary line 186 are incremented toward each other by one position in the grid. For illustrative purposes, a point 188 on boundary 184 and a point 190 on boundary line 186 will be analyzed. Initially, as described above, points 188 and 190 are on the boundary lines 184 and 186, respectively. After one increment of time, boundary line 184 moves to the right to form an intermediate line 192 and boundary line 186 is moved to the left to form an intermediate boundary line 194. In a similar manner, points 188 and 190 will move toward each other and will merge to form a point 196. This is due to the fact that points 188 and 190 are separated by two positions on the grid.

Initially, point 188 has a prime number associated therewith and point 190 has a different prime number associated therewith. These prime numbers are propageted with each movement of the point. When they merge, the product of the two prime numbers is taken and the new point 196 is assigned this number which is not a prime number and also it is assigned a proximity number which is the number of steps required for the two boundaries to meet. The proximity number is the number of spaces required to move from the initial boundary line 184 or 186 to the merging point 196. In this instance, it was a value of "1". After merging, point 196 ceases to move. It can be seen that each point on the boundary line for each incremental move eventually results in a merger, thus forming an edge of merged points. Each point on the edge will have the same product since it is a merger of two boundary lines and products of prime numbers such that a Voronoi edge is defined with a uniquely determined non-prime number. Unless a point on the coordinate system was changed by a merger of two prime numbers to form a Voronoi edge, the number assigned to the coordinate point will not change from the initial value. Therefore, it can be seen that free space is defined by all coordinate points having a value of "0." The boundary and confines of an object are all coordinate points defined by a prime number and the Voronoi edges are all points defined by a non-prime number. A node (not shown), is defined as any point wherein three separate non-prime numbers are assigned to a particular coordinate point as the result of the merger of three separate points.

Figure 14:
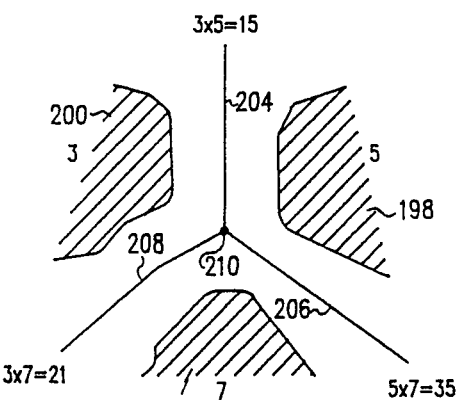

Referring now to FIG. 14, there is illustrated a schematic drawing of the numbers assigned to three obstacles, 198, 200 and 202. Obstacle 198 has the prime number "5" assigned thereto, obstacle 200 has the prime number "3" and the obstacle 202 has the prime number "7" assigned thereto. This will result in a Voronoi edge 204 between obstacles 200 and 198 having a value of 15 which is a product of prime number "3" and "5", a Voronoi edge 206 between obstacles 198 and 202 having a product of "35" and a Voronoi edge 208 disposed between the obstacles 200 and 202 and having a value of "21". The three paths or edges 204–208 intersect at a node 210. As described above, each of the points on the Voronoi edges 204–208 have a proximity number associated therewith defining the distance to the closest edge of the two adjacent obstacles.

Once the points and associated proximity are defined along the Voronoi edges, it is not necessary to determine where the boundaries of the objects are in order to plot a path along these edges. This minimizes the computational cost in finding a safe path through the free space. However, the coordinates of the obstacles are available for calculating the distance from a point in free space to the closest point on the obstacle and also for calculating a straight line path to a node in the event that an unexpected obstacle has occurred. For example, to determine if there is an intersection of an obstacle with a straight line path calculated from any point on the Voronoi edge to the closest node, it is only necessary to determine if each point on the calculated straight line intersects with a point having a prime number associated therewith. It simplifies the computational requirements for determining if there is an intersection between a particular path and an object.

Figure 15:
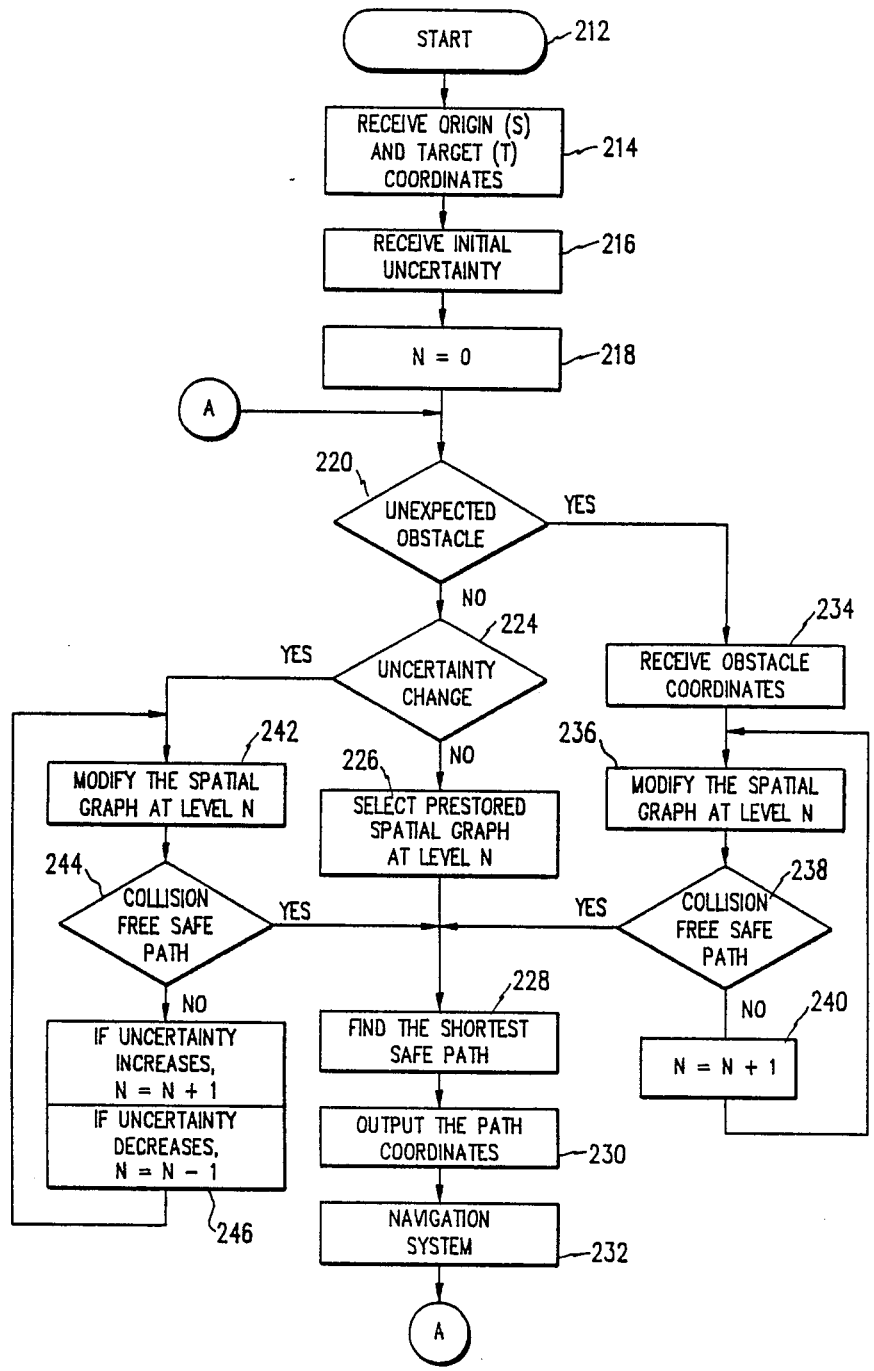
FIG. 15 illustrates a flow chart for determining the shortest safe path.

Referring now to FIG. 15, there is illustrated a flow chart for the general process flow for determining the shortest path. The program is initiated at a start block 212 and then proceeds to a function block 214 to receive the coordinates of the S and T points and then to a function block 216 to receive the initial uncertainty. Normally, the initial uncertainty is "0" since this is the starting point. However, the uncertainty may be greater than "0." The program flows to a function block 218 to function block 220 to set the value of an integer "N" to "0". The integer N is an indication of the level of spatial graphs to be utilized. Initially, the path finding system 12 will attempt to calculate the shortest path over the first level.

After the program is initiated, the program flows to a decision block 220 to determine if there are any unexpected obstacles. If there are no unexpected obstacles are detected, the program flows along the "N" path to a decision block to 224 to determine if there is an uncertainty change. If there is no uncertainty change, the program flows along the "N" path to a function block 226 to select a prestored spacial graph at level N. The program then flows to the a function block 228 to determine what the shortest safe path is in the prestored spacial graph in accordance with the initial uncertainty and the shortest path algorithim. It should be understood that if the uncertainty that was initially received does not allow navigation in any of the paths in the prestored spacial graph, the shortest path algorithim will not allow traversal of these paths.

After the shortest safe path is found, the program flows to a function block 230 to output the path coordinates and then the program flows to a function block 232 indicating operation of the navigation system. The function block 232 has an output which is routed back to the decision block 220. This loop will continue until either an unexpected obstacle is detected or the uncertainty changes. Therefore, path coordinates are continually output to the navigation system.

In the event that an unexpected obstacle is detected, the program flows from a decision block 220 along the "N" path to a function block 234 to receive the obstacle coordinates. These are stored and then the spacial graph at level N is modified, as indicated by a function block 236. The program then flows to a decision block 238 to determine if there is a collision free safe path in level N. If not, the program flows along an "N" path to a function block 240 to increment the value of N, and then the program flows back to function block 236 to again modify the spatial graph at that N level. If a collision free safe path exists in the modified spatial graph at the level N, the program flows from the decision block 238 to the function block 228 to find the shortest path on the modified spatial graph at level end.

In the event that there is an uncertainty change, at decision block 224, the program flows along the "Y" path to a function block 242 to modify the spatial graph at level N. The program then flows to a decision block 244 to determine if there is a collision free safe path available at this level. If not, the program flows along an "N" path to a function block 246. The function block 246 makes two determinations. First, if the uncertainty increases the value of N is incremented. Second, if the value of the uncertainty decreases, the value of N is decremented. As described above, it is desirable to navigate the lowest level possible. Since one of the reasons for incrementing to a higher level is due to an increase in uncertainty, a decrease in uncertainty may result in moving back to a lower level, if a safe path is available at the lower level. The program then flows from the function block 246 back to the function block 242 to modify the spatial graph at level N. If a collision free safe path is available at level N, the program flows from decision block 244 along the "Y" path to the function block 228 to find the shortest safe path.

Figure 16:
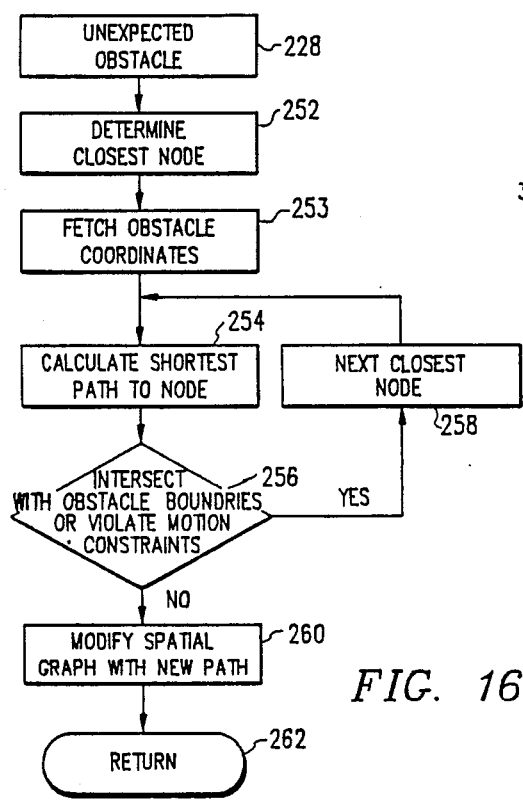
FIG. 16 illustrates a flow chart for altering the path in the presence of an unexpected obstacle.

Referring now to FIG. 16, there is illustrated a flow chart for generating a new path when an unexpected obstacle is incurred. The flowchart is entered at function block 234 and then flows to a function block 252 to determine the closest Voronoi node to the point at which the unexpected obstacle was perceived. The program then flows to a function block 253 to fetch the known obstacle coordinates. As described above, each of these coordinates has associated therewith a prime number. These are the actual coordinates on the map. The program then flows to a function block 254 to calculate the shortest straight line path to the closest node and then the program flows to a decision block 256 to determine if the straight line path intersects with any of the obstacle boundaries, i.e. a search is made of any intersection with a coordinate having a prime number associated therewith or the angle between the cureent heading nad straight line movement is greater than the maximum turn angle. If the answer is yes, the program flows along a "Y" path to the function block 258 to select the next closest node and then to the input of function block 254 to again calculate the straight line shortest path to that node. This continues until a non-intersecting straight line is calculated, thus satisfying the turn angle constraint. The program then flows along the "N" path from the decision block 256 to a function block 260 to modify the spatial graph with this new path. The program then flows back to the main program through a return block 262.

Navigation under the method of the present invention provides for calculation of the shortest path along predetermined collision free edges or "valleys" between obstacles. This substantially reduces the computational time and cost involved in computing the shortest path. If a collision free path of any sort is not available in that particular two-dimensional slice, the next adjacent two-dimensional slice is searched to determine if there is a collision free path and, if so, then the shortest path is calculated on that slice. However, the concept of the present invention can be applied to a three-dimensional space. In the three-dimensional space, a spatial graph can be generated which defines the set of points which are equi-distance from the boundaries of all adjacent obstacles. The result will be a set of points defining collision free surfaces in the three-dimensional space over which collision free travel is permitted. A shortest path algorithm will then be utilized to determine what the shortest path over the surface is. The same principals with respect to the handling of uncertainty and unexpected obstacles apply to the three-dimensional technique as compared to the two-dimensional technique.

In summary, there is provided a path finding solution for determining the shortest collision free path between two points in a three-dimensional space. A spatial graph is first generated and prestored with the spatial graph defining the set of points defining all potential safe paths within the region for each contour layer. Each of the points has associated therewith certain constraints. The set of points is then searched to determine if any of the safe paths are available within the consraints and, if not, the spatial graph is then modified to generate a new safe path spatial graph at a different layer if necesary. The shortest path is then calculated on the set of points in the modified safe path spatial graph and then output to a navigation system. In the event that navigational limitations change and exceed certain of the constraints, thus nullifying the safe path spatial graph, a new spatial graph can be generated to account for these limitations. The new shortest path coordinates are then output to the navigation system from the point at which the change in the navigational limitations occurred.

Although the preferred embodiment has been described in detail, it should be understood that various changes, substitutions and alternations can be made therein without departing form the spirit and scope of the invention as defined by the appended claims.

What is claimed is:

1. A method for collision free navigation in a predefined region comprising:
    storing a predetermined set of points defining the available paths through navigable free space in the region, each of the points having associated therewith predetermined navigational constraints;
    receiving externally generated position coordinates;
    receiving externally generated navigational limitations;
    comparing the received navigational limitations with the navigational constraints associated with the stored predetermined set of points to determine the ones of a predetermined set of points that can be safely navigated;
    generating a collision free set of points that is comprised of the ones of the predetermined set of points that can be safely navigated through the free space in the region;
    calculating the shortest path through the collison free set of points that can be navigated from the received position coordinates to a predetermined goal; and
    outputting coordinates defining the calculated shortest path.

2. The method of claim 1 wherein the navigational constraints associated with each one of the predetermined set of points is comprised of the proximity of each of the points to the nearest boundary of the free space in the region.

3. The method of claim 1 wherein the region is three-dimensional and is divided into discrete two-dimensional levels, each level represented by a set of points defining it out of the available paths through the free space in the associated two-dimensional level, each of the points having associated therewith the predetermined navigational constraints.

4. The method the claim 3 wherein the predetermined set of points for each two-dimensional level is comprised of a plurality of nodes in the free space of the two-dimensional level interconnected by discrete paths, each path defining a navigable set of points through the free space between nodes.

5. The method of claim 3 wherein the navigational constraints are comprised of proximity information associated with each point, the proximity information defining the proximity of the associated point with the nearest two-dimensional free space boundary.

6. The method of claim 5 wherein each point is disposed equi-distant between the closest points on the two nearest boundaries in the free space in the associated two-dimensional level.

7. The method of claim 3 wherein the levels are arranged in an ascending order and the step of calculating the safest path comprises:
determining the lowest level in which there exists a set of points defining at least one collision free path between the received position coordinates and the goal; and
calculating the shortest path through the collision free set of points in the determined lowest level that can be navigated from the received position coordinates to the goal.

8. The method of claim 1 wherein the step of generating the collision free set of points comprises the step of removing ones of the predetermined set of points that cannot be safely navigated, with the remaining points defining the collision free set of points.

9. A method for providing a collision free path to a navigation system to allow collision free navigation through navigable free space in a three-dimensional space, comprising:
storing a plurality of predetermined spacial graphs each associated with a two-dimensional level in the three-dimensional space, each of the predetermined spacial graphs representing all available discrete paths through the associated two-dimensional level with all available paths interconnected and each path having associated therewith predetermined navigational constraints;
receiving externally generated position coordinates to define the present position of the navigation system in the three-dimensional space;
receiving externally generated navigational limitations from the navigation system;
comparing the received navigational limitations with the predetermined navigational constraints for each of the available paths on each of the levels to determine for each of the levels ones on the available paths that can be safely navigated;
generating a collision-free spacial graph for each two-dimensional level, each collision free spacial graph comprised of the available safe paths of the corresponding predetermined spacial graph that can be safely navigated collision free;
calculating the shortest path along the collision free available paths between the present position and a predetermined goal and in accordance with a predetermined shortest path algorithim; and
outputting coordinates defining the calculated shortest path to the navigation system.

10. The method of claim 9 wherein each of the predetermined spacial graphs is comprised of a plurality of nodes disposed in the free space in each of the associated two-dimensional levels with each of the discrete paths connected between two of the nodes, with each of the paths comprising a set of discrete points which define coordinates for traversing the associated discrete path between the two nodes.

11. The method of claim 10 wherein each of the points on each of the discrete paths is equi-distant from the two nearest boundaries of the free space in the associated one of the two-dimensional levels.

12. The method of claim 11 wherein the spatial graphs are Voronoi graphs.

13. The method of claim 10 wherein the navigational constraints associated with each of the points on the associated paths is comprised of proximity information regarding the distance to the nearest point on the free space boundary.

14. The method of claim 13 wherein the navigational limitations comprise information regarding the maximum proximity that can be safely navigated.

15. The method of claim 13 wherein the step of receiving the navigational limitations comprises:
receiving the coordinates of an unexpected obstacle blocking one of the collision free available paths; and inhibiting use of this path in calculating the shortest path.

16. The method of claim 9 wherein the two-dimensional levels are arranged in ascending order with the lowest level having highest priority and the highest level having lowest priority such that the lowest two-dimensional level having a collision free available path is selected for calculation of the shortest path between the present invention and the predetermined goal.

17. The method of claim 9 wherein the navigational constraints comprise information regarding proximity of the path to the free space boundary and the navigational limitations comprise uncertain, information to define the minimum proximity that can be navigated collision free.

18. The method of claim 9 and further comprising calculating the shortest collision free path from the present position to the closest point on the closest one of the available paths in accordance with a second predetermined shortest path algorithm when the present position is not on one of the available paths.

19. The method of claim 18 and further comprising calculating the shortest collision free path from the goal to the closest point on the closest one of the available paths in accordance with a second predetermined shortest path algorithm when the goal is not on one of the available paths.

20. A method for providing a collision free path for a navigation system to allow collision free navigation through navigable free space between obstacles in a three-dimensional space, comprising:
storing a plurality of predetermined spacial graphs each associated with a two-dimensional level in the three-dimensional space, each of the spacial graphs representing all available discrete paths through the free space in the associated two-dimensional level with all available paths interconnected and each path having associated therewith proximity information defining the proximity of the path to the obstacle closest thereto;

receiving externally generated position coordinates to define the position of the navigational system in the three-dimensional space;

receiving externally generated uncertainty information from the navigation system as to location;

determining the maximum proximity of a path that can be navigated collision free within the constraints of the received location uncertainty;

selecting the lowest level spacial graph having a path with a proximity that allows collision free navigation in accordance with the location uncertainty constraints, the spacial graphs arranged in an ascending order from the lowest level to the highest level;

generating a collision free spacial graph comprised of paths of the selected predetermined spacial graphs that can be safely navigated collision free in accordance with the location uncertainty constraints;

calculating the shortest path along the collision free available paths between the present position and a predetermined goal and in accordance with a predetermined shortest path algorithm; and outputting coordinates defining the calculated shortest path to the navigation system.

21. The method of claim 20 wherein each of the predetermined spacial graphs is comprised of a plurality of nodes disposed in the free space in each of the associated two-dimensional levels with each of the discrete paths connected between two of the nodes, each of the paths comprising a set of discrete points which define coordinates for traversing the associated discrete path between the two nodes.

22. The method of claim 21 wherein each of the points on each of the discrete paths is equi-distant from the boundary of the two nearest adjacent obstacles in the associated one of the two-dimensional levels.

23. The method of claim 22 wherein the spacial graphs are Voronoi graphs.

24. A method for providing a collision free path for a navigation system to allow collision free navigation between obstacles in a three-dimensional space, comprising:

storing a plurality of predetermined spacial graphs each associated with a two-dimensional level in the three-dimensional space, each of the predetermined spacial graphs representing all available discrete paths through the associated two-dimensional level between known obstacles;

receiving externally generated coordinates of an unexpected obstacle when the unexpected obstacle is detected;

receiving externally generated position coordinates to define the present position of the navigation system in the three-dimensional space when the unexpected obstacle is detected;

modifying the predetermined spacial graphs to remove any of the available paths in any of the two-dimensional levels that are blocked by the obstacle;

determining the shortest collision free straight line path from the point of detection of the unexpected obstacle to the closest point on the modified spacial graph in accordance with predetermined motion constraints to define a new starting coordinate;

selecting the lowest level of the modified spacial graphs having an available path between the new starting coordinates and a predetermined goal;

calculating the shortest path along the available path in the selected level between the new starting coordinates and the predetermined goal and in accordance with a shortest path algorithm;

outputting the coordinates of the calculated shortest path through the navigational system.

25. The method of claim 24 wherein the predetermined motion constraints comprise a maximum turning angle.

26. The method of claim 24 wherein each of the predetermined spacial graphs is comprised of a plurality of nodes disposed in the free space in each of the associated two-dimensional levels with each of the discrete paths connected between two of the nodes, with each of the paths comprising a set of discrete points which define coordinates for traversing the associated discrete path between the two nodes.

27. The method of claim 26 wherein the step of determining the shortest straight path from the point of detection of the unexpected obstacle to the closest point on the available path comprises determining the shortest straight line path from the point of detection to the closest node, which shortest path does not intersect with an obstacle, with the node defining the new start coordinates.

28. The method of claim 26 wherein each of the points in each of the discrete paths are equi-distant from the boundaries of the two nearest obstacles in the associated one of the two-dimensional levels.

29. The method of claim 28 wherein the spacial graphs are Voronoi graphs.

* * * * *